(No Model.) 2 Sheets—Sheet 1.
J. J. HOGAN.
COUPLING FOR PIPES WITH FLARED ENDS.
No. 473,462. Patented Apr. 26, 1892.
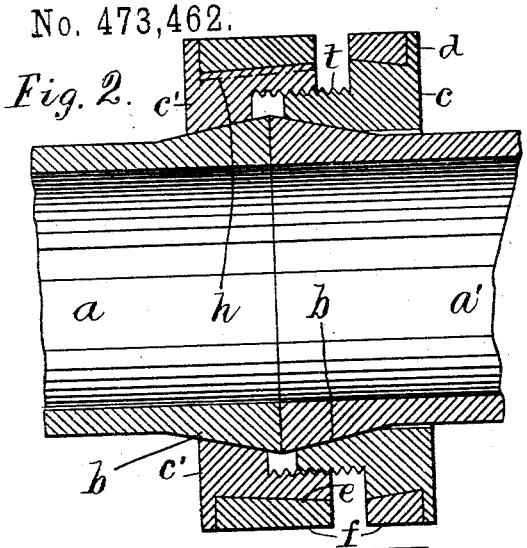
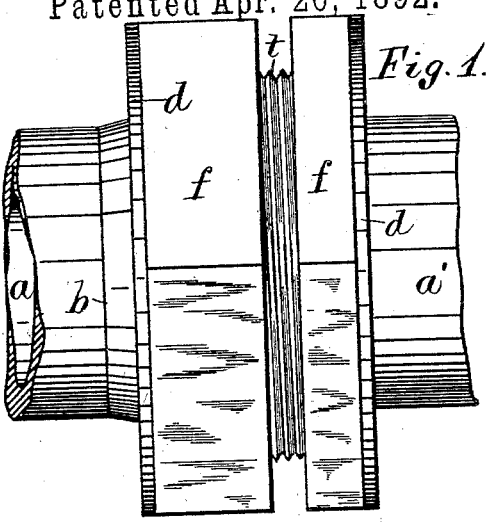
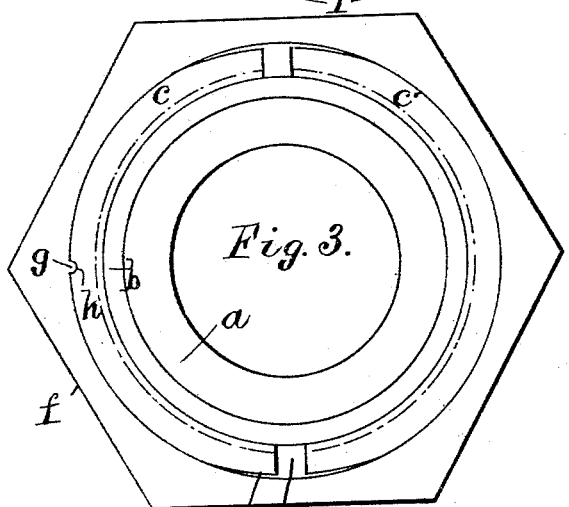
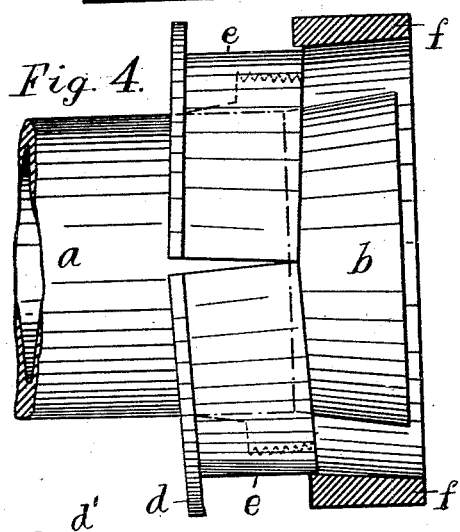
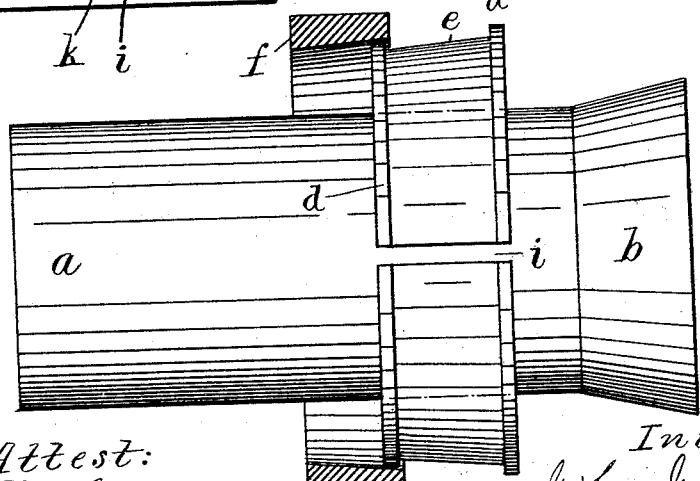
Attest:
L. Lee.
J. Van Nest Jr.
Inventor.
John J. Hogan
per Crane & Miller Attys (No Model.) 2 Sheets—Sheet 2.
J. J. HOGAN.
COUPLING FOR PIPES WITH FLARED ENDS.
No. 473,462. Patented Apr. 26, 1892.
Fig 6.
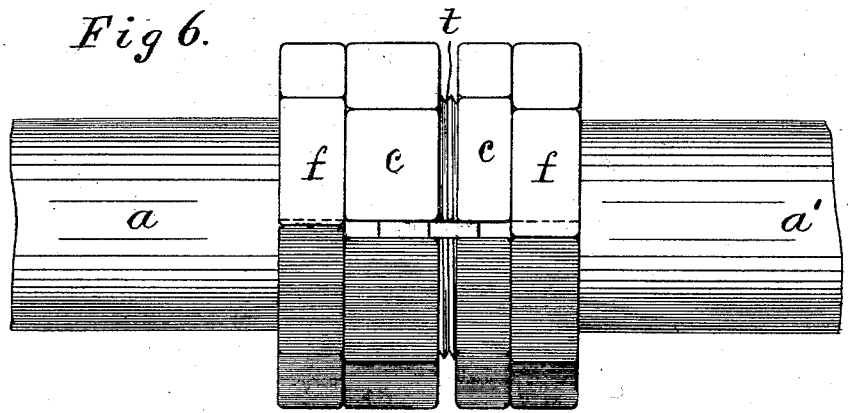
Fig. 7.
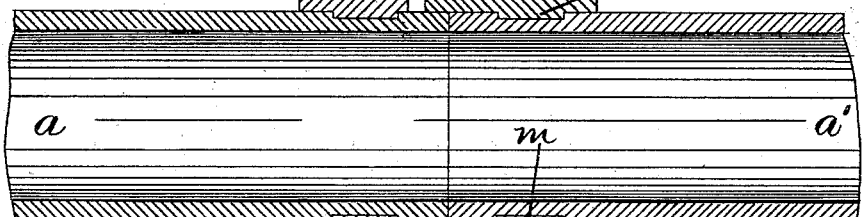
Fig. 8. Fig. 9. Fig. 10.
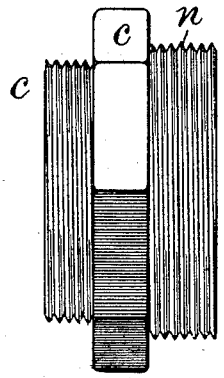
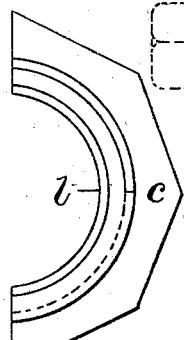
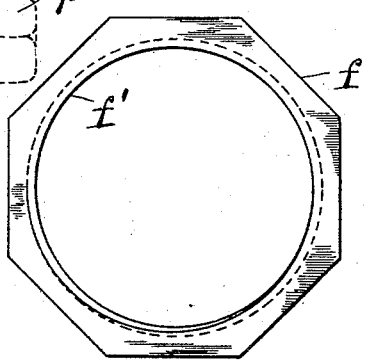
Attest:
L. Lee.
J. Van Nest Jr.
Inventor.
John J. Hogan, per
Crane & Miller, Attys

UNITED STATES PATENT OFFICE.

JOHN J. HOGAN, OF BROOKLYN, ASSIGNOR TO THE HOGAN ENGINEERING COMPANY, OF NEW YORK, N. Y.

COUPLING FOR PIPES WITH FLARED ENDS.

SPECIFICATION forming part of Letters Patent No. 473,462, dated April 26, 1892.

Application filed June 18, 1891. Serial No. 396,697. (No model.)

*To all whom it may concern:*

Be it known that I, JOHN J. HOGAN, a citizen of the United States, residing at Brooklyn, Kings county, New York, have invented certain new and useful Improvements in Couplings for Pipes with Flared Ends, fully described and represented in the following specification and the accompanying drawings, forming a part of the same.

In this invention the joint is formed by butting the ends of the pipes together with or without an intervening packing; and the construction consists in a sleeve divided longitudinally in halves for locking upon the end of each pipe and a collar applied to the outside of the sleeve for holding the divided halves of the sleeve upon the pipe end, the sleeves being provided with suitable means for drawing them toward one another and thus pressing the pipe ends against one another. The divided sleeve may be locked upon the pipe end by flaring the pipe end externally and providing the sleeve with a conical seat to fit the same, or the pipe ends may be grooved and the sleeves formed with an annular tongue to fit such grooves.

The invention is especially applicable to pipes having flared ends, as the division of each sleeve longitudinally into two parts permits the application of the parts behind the flared end of the pipe. Such divided parts are then locked upon the pipe end by the external collar, and the sleeves are adapted to draw the pipe ends together, as desired.

The construction will be understood by reference to the annexed drawings, in which—

Figure 1 is an external view of two pipe ends united by my coupling. Fig. 2 is a longitudinal section of the same. Fig. 3 is an end view of the parts wholly connected, as shown in Fig. 1. Fig. 4 represents the mode of applying the locking-collar to the divided sleeve from the outer end of the sleeve, and Fig. 5 the mode of applying the collar to the sleeve from the inner end, the collars being shown in section. Fig. 6 is an external view of two pipe ends with a coupling adapted to lock in a groove in such ends. Fig. 7 is a longitudinal section of the same construction. Fig. 8 is a side view of one part of the divided sleeve. Fig. 9 is an end view of the same, and Fig. 10 is a side view.

The invention will first be described in connection with pipes having flared ends and afterward with pipes grooved to fit a tongue upon the interior of the coupling-sleeve.

In Fig. 2 cast-iron pipes $a\,a'$ are represented with their exteriors thickened or flared to form a conical seat $b$. The sleeve upon the pipe end $a$ is formed internally to fit the conical or flared seat $b$. It is divided axially into two parts $c\,c'$ and is furnished at its outer end with a peripheral flange $d$ and upon its outer surface with a circular seat $e$, which is tapered slightly toward the flange $d$ to retain thereon the locking-collar $f$, which is tapered internally to fit such seat. The sleeve upon the pipe end $a'$ is similarly constructed, and the sleeves are furnished with corresponding screw-threads $t$ for drawing them toward one another to press the pipe ends together.

In Figs. 1, 2, and 3 the parts are shown assembled in their operative relations, and the collar $f$ is shown in Figs. 2 and 3 prevented from turning around upon the seat $e$ by a small tongue $g$, fitted to a groove $h$ in the exterior of the sleeve. The exteriors of the collars are shown in Figs. 1 and 3 with flat faces adapted to receive a wrench, and the sleeves upon the two pipe ends may thus be turned around to screw the threads $t$ together. It is obvious that the external collars $f$ could be readily slipped upon the divided parts of the sleeve if the circumference of the latter were formed with a plain or cylindrical seat instead of the flared seat $e$, which is provided to hold the collar from longitudinal movement upon the sleeve. To apply the collar upon such a seat upon the sleeve, a small portion of each sleeve is removed at the division $i$, so that the parts of the sleeve may be pressed toward one another and inclined slightly forward, as shown in Fig. 4, when the sleeve is slipped back from the flared end to the body of the pipe. The smaller end of the collar $f$ is then slipped over the divided parts of the sleeve, which may then be drawn forward to the conical seat $b$. This expands the sleeve within the collar and holds the latter securely thereon. To admit the collar over the sleeves at the division $i$, where the diameter is not affected by pressing the divided parts together the sleeves may be formed with a thin end $k$ adjacent to the division. The collar may also be applied to the sleeve from the outer end of the same by reducing the diameter of the flange $d$, which holds the collar upon the smaller end of the seat $e$. With such construction, as shown in Fig. 5, a flange $d'$ may also be applied at the inner end of the sleeve, and the collar $f$ would then be secured between the two collars when in its operative position. Such a method of applying the collar would require the thinning down of the flange $d$ upon the sleeve adjacent to the division $i$, as described in connection with the thin parts at $k$ in Fig. 3.

In Figs. 6 to 9, inclusive, the sleeves $c$ are constructed for application to straight wrought-iron pipes, being formed internally with annular tongues $l$, fitted to grooves $m$, of rectangular section, upon the pipe ends. Such grooves may be formed of any convenient section by a slight modification of the pipe-cutter tools used for severing wrought-iron pipe, and the coupling-sleeves may be readily cast with the tongue of corresponding shape therein. The locking-collar $f$ is formed internally with a screw-thread $f'$, and the exterior of each divided sleeve is formed with a screw-thread $n$ to fit the same. The tongue within the sleeve is fitted to the groove upon the pipe end, as shown in Fig. 7. The threaded collar $f$ is then screwed upon the exterior of the sleeve, and the sleeves are then locked securely upon the pipe ends and are adapted to be drawn together by screw-threads, as shown at $t$ in Figs. 1 and 2, or by flanges $o$ and bolts $p$, as indicated by dotted lines in Fig. 7. The locking-collar which encircles the sleeve parts holds them firmly in position when adjusted, and the screw-threads $t$, if formed upon the divided parts of the sleeve, are held accurately in place, and thus adapted to operate smoothly. At the present time such screw-threads may be accurately formed by casting, so that the entire sleeve parts may be adapted for use without any tool-work or finishing.

By my construction a coupling is provided that may be quickly applied to the flared ends of cast or wrought metal pipes and operated to clamp the same firmly together.

It is obvious that my device may be employed for pressing a pipe end toward the face of a pipe-fitting if the fitting be provided with a screw-thread or flange corresponding with the one formed upon the sleeve. I have therefore claimed herein the divided sleeve fitted to the pipe end, in combination with the exterior collar and means for drawing the sleeve longitudinally, as it is equally adapted for coupling the pipe end with an opposed fitting or with a similar pipe end. Where the sleeves are provided with threads $t$ for drawing them toward one another, the sleeve or collar must be provided with means for turning the same, as shown by the flattened surfaces upon the collars in Fig. 3 and upon the sleeves and collars in Fig. 6; but where the bolting-flanges are used no means for turning the sleeve would be required.

Having thus set forth the nature of the invention, what is claimed herein is—

1. The pipe-coupling consisting in the pair of divided sleeves $c\ c'$, formed internally to lock upon the pipe ends and provided with the corresponding screw-threads $t$, as set forth, and the collars $f$, fitted to the exteriors of the sleeves to lock their divided parts together, substantially as herein set forth.

2. A coupling for pipe with flared ends, consisting in the divided sleeve fitted internally to the flared end of the pipe and provided with screw-thread, as set forth, and the collar $f$, fitted to the exterior of the sleeve to lock the divided parts together and provided with means for turning the same, substantially as herein set forth.

3. In a coupling for pipe with flared ends, the combination, with the divided sleeves fitted internally to the flared ends of the pipes and provided with the tapering seats $e$, flanges $d$, and corresponding screw-threads, as set forth, of the collars $f$, fitted to the seats $e$ upon the sleeves and provided with means for turning the same, substantially as herein set forth.

JOHN J. HOGAN.

In presence of—
 L. C. DAWES,
 T. S. CRANE.